United States Patent [19]

Hill et al.

[11] 4,243,254
[45] Jan. 6, 1981

[54] SLIP FIT TYPE TUBING COUPLING

[75] Inventors: Donald C. Hill, Pasadena; Robert W. Lyall, Fountain Valley, both of Calif.

[73] Assignee: R. W. Lyall & Co., Inc., Santa Fe Springs, Calif.

[21] Appl. No.: 169

[22] Filed: Jan. 2, 1979

[51] Int. Cl.³ .............................................. F16L 33/18
[52] U.S. Cl. ..................................... 285/242; 285/340; 285/369; 285/423
[58] Field of Search ............... 285/340, 242, 105, 369

[56] References Cited

U.S. PATENT DOCUMENTS

| 2,995,388 | 8/1961 | Morello, Jr. et al. | 285/340 |
| 3,434,744 | 3/1969 | Yoke et al. | 285/340 X |
| 3,545,794 | 12/1970 | Wise et al. | 285/340 X |
| 3,995,897 | 12/1976 | Paskert | 285/340 |
| 4,084,843 | 4/1978 | Gassert | 285/340 |
| 4,123,090 | 10/1978 | Kotsakis et al. | 285/340 X |
| 4,146,254 | 3/1979 | Turner et al. | 285/105 |

FOREIGN PATENT DOCUMENTS

| 746391 | 11/1966 | Canada | 285/340 |
| 1457186 | 9/1966 | France | 285/340 |
| 229917 | 2/1944 | Switzerland | 285/340 |
| 999924 | 7/1965 | United Kingdom | 285/340 |
| 1486671 | 9/1977 | United Kingdom | 285/340 |

Primary Examiner—Thomas F. Callaghan
Attorney, Agent, or Firm—Cole, Jensen & Puntigam

[57] ABSTRACT

A threadless coupling for rapid connection to a valve or fitting and to pipes or tubing for fluid distribution systems such as for gas or water. The coupling comprises an outer housing having an internal arrangement of O-rings and unique spacers, lock rings and other members for gripping tubing when inserted and, once inserted, the tubing is firmly gripped to provide a substantial amount of tensile resistant loading thereon.

13 Claims, 7 Drawing Figures

SLIP FIT TYPE TUBING COUPLING

BACKGROUND OF THE INVENTION

The invention relates to improvements in slip fit or so-called "stab" type coupling joints for smooth wall tubing, and more particularly to a threadless coupling which can be rapidly connected to smooth wall piping or tubing for fluid distribution systems such as gas and water.

Pipe couplings of various types are well known in the prior art. Many of the prior art type couplings require the ends of the pipe or tubing to be threaded, flanged, flared, belled or otherwise pre-treated, deformed or specially formed. Such couplings have not been totally satisfactory since the special formation or treatment is time consuming and costly and most objectionably makes assembly or installation in the field difficult. Design of the threadless couplings is to some extent controlled by the type of pipe or tubing with which the joint is to be used. For example, some prior art type coupling joints employ so-called "Chinese" fingers. Others use a compression coupling approach which utilize gripper rings, both solid and split, but have lacked flexibility in the design of their component parts. In addition, the split gripper rings have to be cammed to contract about the pipe in order to grip when an outward load is applied. A principle problem has been in designing a threadless coupling having acceptable pull-out resistance, installation load and initial and final grip specifications. Other prior art designs have utilized "belleville" springs which are frusto-conical locking rings which have to be flattened to a planar condition to reduce the interior diameter of the same to grip the tubing. In other configurations, gripper washers, whether solid or split, and having radially inwardly extending teeth have been used but in these types design of the joint and manufacture of the same is complicated. Furthermore, the prior art devices do not allow for rotation of the tubing. Thus, complexity of design resulting in manufacturing and field installation difficulties have been continuing problems. The prior art devices simply have not provided sufficient tensile strength for particular purposes such as for couplings of cast iron or steel, nor are they easily produced in variable or high constant tensile strength configurations. They are difficult to remove from coupled pipes, and have not had effective sealing when utilized with a section of pipe or tubing having an out-of-round condition on the outer surface or if scratches or marring of the tube surface were present.

Among the prior art patents considered with respect to this invention are the following U.S. Pat. Nos.: 1,817,776; 2,491,004; 3,645,567; 3,924,877; 3,924,882; 3,995,897; 4,062,574; and 4,073,514, all of which are considered to be of interest only.

SUMMARY OF THE INVENTION

An improvement in threadless type coupling joints which includes a cylindrical housing having an opening in its outer end for receiving the tubing and within which housing there is an annular bore or recess with a back or bottom offset wall located towards the outer end. The other end of the coupling receives the internal components comprising a specific arrangement of O-rings and specially shaped spacers, lock rings, retainer plate and stiffener which component parts give the coupling its unique functional capabilities. The inner or mounting end of the coupling is designed to allow easy access and arrangement of the internal components as well as to mount the housing to another coupling or to valves or to other parts or members of a fluid distribution system. The coupling includes a stiffener tube to be received in that portion of the tubing in the housing and which has an offset wall thickness which makes its inner end portion heavier in thickness than the outer portion.

Accordingly, it is among the many objects, features and advantages of the invention to provide a new and improved threadless pipe or tubing coupling which is easily produced in a variety of diameters utilizing the novel arrangement of housing and internal components as set forth in the following specification. The coupling is easily assembled and manufactured and permits almost instant field installation and connection and which also compensates for out-of-round or over and under dimensions in the wall thicknesses of tubings. The invention is not a conventional Chinese finger or a compression type coupling as is so often seen in the prior art. The tubing may be rotated in the coupling without any loss of sealing ability or reduction of tensile strength. Scratches, burrs and other forms of damage in the surface of the tubing ends will not affect the sealing capability of the coupling. The stiffener within the tubing prevents loss of compression strength in the coupling due perhaps to tensile stresses on the tubing. The invention can be used as a double-ended coupling or as a single, such as for a riser, and furthermore can be used on T's or valves or other piping system members. The stiffener prevents tubing collapse and therefore the lock rings do not lose their gripping effect. The housing can be metal or molded plastic. The stiffener assists in resisting bending moments applied to the coupling and does not allow the tubing to neck down over that portion of the tubing into which the stiffener extends. The invention is durable, rugged, long lived and inexpensive to manufacture.

DESCRIPTION OF THE PREFERRED EMBODIMENT

Figure 1:
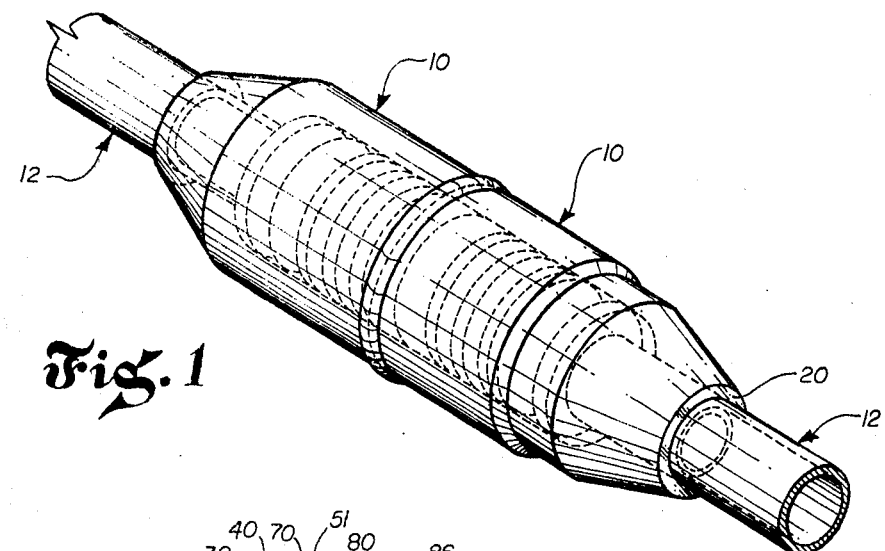
FIG. 1 is a partial view in perspective showing a double ended coupling arrangement to illustrate general details of the invention.
Figure 2:
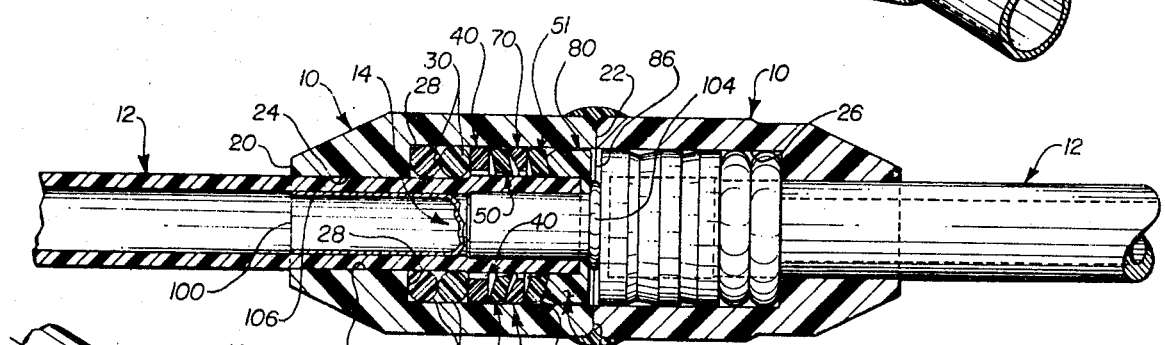
FIG. 2 is an axial cross-section view of the embodiment of FIG. 1 showing additional internal details of the invention.
Figure 3:
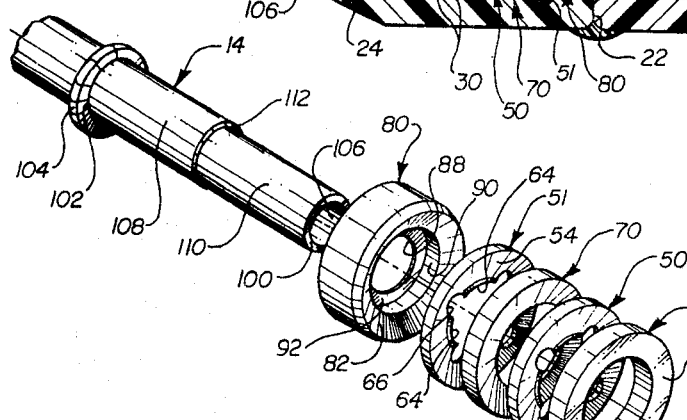
FIG. 3 is an exploded view of the arrangement of FIGS. 1 and 2 in order to further illustrate details of the coupling.

The slip fit type coupling of this invention is best seen in FIGS. 1 through 3. Since FIG. 2 shows a mirror image or double embodiment only one half of the assembly will be described.

The invention comprises a housing, generally designated by the number 10, and tubing 12, as well as stiffener 14 and internal components which will be described in detail hereinafter.

The housing has outer end 20 and inner or mounting end 22. As can be seen, the housing is an elongated, cylindrical member having a tubing receiving cavity or bore 24 extending through perhaps a third of the outer end portion thereof. A large diameter bore or cavity 26 is formed in the remainder of the housing and opens on the inner or mounting end 22. The larger bore 26 thus defines in conjunction with the smaller bore 24 a rear or back radially offset wall surface 28. In this manner, there is formed an essentially simple but novel cylindrical housing member for containing the internal components. The outer end bore 24 is the diameter of the tubing which will be accommodated in the coupling. The larger bore 26 defines an annular cavity around the outside of the tubing 12 and the components which are received therein will now be described. It will be appreciated that the housing 10 may be a plastic as well as of steel.

Next to and seated against the offset wall 28 are O-ring seal members 30 of which there are shown to be two in number. The O-ring seals 30 abut one another and thus act as the seal means for preventing fluid such as gas or liquid from entering or leaking out of the coupling housing between tubing 12 and bore 24.

Figure 7:
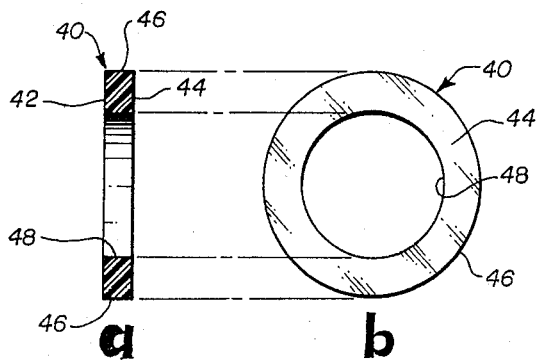
FIG. 7 is a cross-section and elevational view of the flat spacer between the O-rings and the lock rings.

The next internal component, shown in FIG. 7 as well as in FIGS. 1 through 3, is a flat spacer or thick washer type member 40 having generally parallel right-angle side or end surfaces 42 and 44 and outer edge surface 46 as well as interior wall surface 48. The flat spacer 40 acts, as stated above, as a retainer member for O-rings 30 and is also a stop surface for the first lock ring to be described hereinafter. Hence, between bottom or offset surface 28 and spacer 40 the O-rings are effectively restrained against any movement or distortion which could prevent them from performing their sealing function. It will be noted that the internal surface 48 of the spacer 40 allows ample clearance for the outside diameter of tubing 12.

Figure 6:
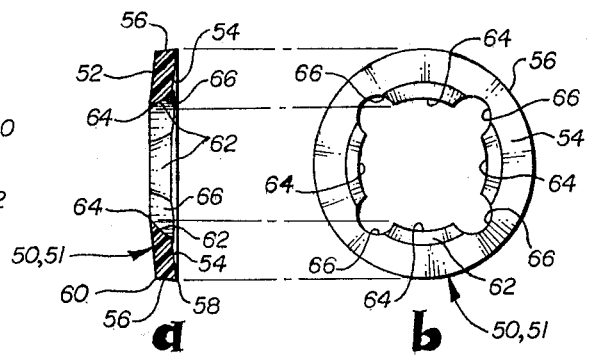
FIG. 6 is a cross-section and elevational view of the lock ring configuration.

The next member in the assembly of the internal components is first lock ring 50 and is shown in detail in FIG. 6 of the drawings. The lock ring 50, duplicated also in second lock ring 51, can be seen to have a crowned end surface 52 and on the opposed side or end in inwardly angled or concave side or end surface 54. The inwardly angled end surface 54 will be located or positioned as best seen in FIG. 2 facing the direction from which the tubing will be entering the housing. It will be noted that the edge surface 56 of the lock ring is slightly angled from a largest diameter point 58 on the concave side 54 to a slightly lesser diameter point 60 on the crown side. Since the tubing will be received from the side 54 there will be some flexing of the lock ring in the direction of the crowned side 52. Thus, a slight, radially inward angle on the edge 56 allows the lock ring to flex in the direction of the crown without restriction or binding because the outer edge surface 56 can move outwardly. The teeth of the lock ring are defined by an internal angled surface 62 which may be straight or concavely curved as shown in the drawings to define tooth edge 64. Spaced apart areas 66 on the interior of the lock ring enable the tooth edges 64 to flex as the tubing is inserted. It will be understood that the recessed or inwardly beveled surface 54 of the lock ring also enables the lock ring to flex towards the outer end 20 of the housing if tensile loads should be placed on the tubing 12 in an effort to dislodge it from the coupling.

Figure 4:
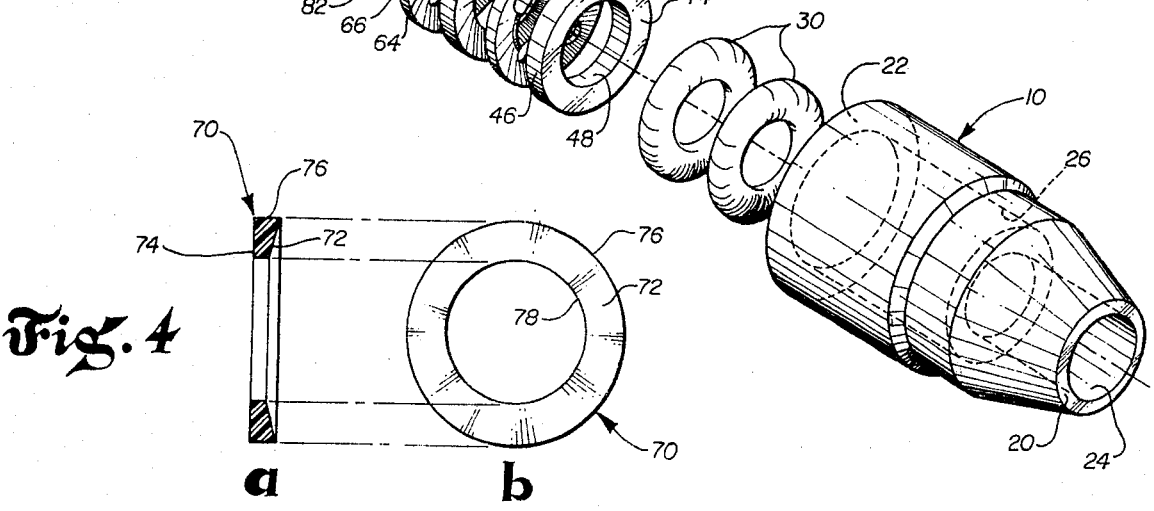
FIG. 4 is a cross-section and elevational view of the beveled spacer member which is located between lock rings.

Located between the lock ring 50 and identical lock ring 51 is beveled spacer 70, details of which are seen in FIG. 4. Beveled spacer 70 has an inwardly beveled or angled side 72 which can be seen in FIG. 2 to face first lock ring 50 and has a right angle side 74 facing the inner end of housing 10. Spacer 70 has an outer or edge wall 76 and internal wall surface 78. Again, as seen in FIG. 2, the inwardly angling beveled surface 72 faces first lock ring 50 to permit flexing of the crowned side 52 of the lock ring when tubing is inserted.

Following the beveled spacer 70 is second and identical lock ring 51 the details of which are identical to the first lock ring 50 as shown in FIG. 6. In both lock rings 50 and 51 the dimensions thereof are such that the teeth edges 64 do not penetrate more than about 10% of the thickness of the tubing wall. Also, the number of cut-out areas 66 will vary with the diameter of the pipe being coupled.

Figure 5:
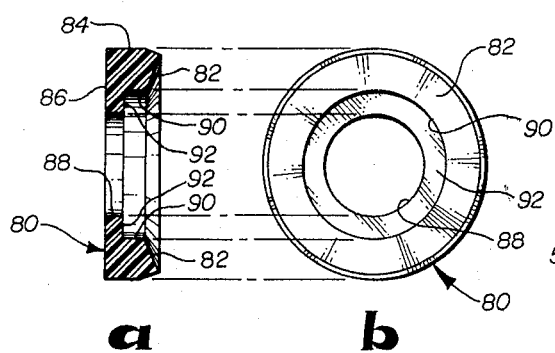
FIG. 5 is a cross-section and elevational view of the end or retainer plate at the mounting end of the coupling.

Finally the end of the housing is closed by a retainer or back plate, generally designated by the number 80, and also shown in FIG. 5. On its inside surface, back plate 80 has an inwardly angled surface 82 which serves the same function as beveled surface 72 of spacer 70 with respect to first lock ring 50. The inwardly beveled surface 82 of the back plate allows flexing of the crowned surface 52 of the second lock ring 51. In addition, the back plate has outer cylindrical wall surface 84 and a generally flat or right angle end surface 86. An inner bore 88 of the back plate 80 is approximately the same diameter as the inside diameter of the tubing which the coupling is intended to accommodate. The inwardly angled surface 82 extends inwardly a distance less than the bore 88 so that longitudinal or axial surface 90 is defined to receive the outside diameter of tubing 12. The diameter 90 and diameter 88 thus define a radially offset surface 92 against which the end of the tubing contacts when it inserted and in position. It will be seen by reference to FIG. 2 that the rearmost surface 86 of back plate 80 is slightly recessed with respect to the end surface 22 of housing 10.

The stiffener 14 has an outer end 100 as seen in FIGS. 2 and 3 and an inner end 102 which includes annular flange or ridge 104. The stiffener 14 has a generally consistent interior diameter or bore 106. The outer diameter of the stiffener has an "upset" or initially heavier wall portion 108 over the inner first half of its length and a lighter or thinner wall portion 110 on the outer half portion of its length thus creating upset 112. The so-called upset of approximately 0.005 to 0.010 inches results in the heavier wall section 108 to give additional holding power to the lock rings because of the allowable tolerances which can exist in tubing wall thicknesses. A loose fit in the stiffener with respect to the inside of the tubing might deprive the lock rings of gripping power. Ridge 104 of the stiffener enables the stiffener to hold its position. Tubing 12 cannot collapse around that portion of the tubing which contains the stiffener. The stiffener can be made of metal or plastic. In the event that sufficient tensile force is applied to plastic tubing 12 it would not begin to neck down within the housing even though no longitudinal or axial movement of tubing 12 is in fact permitted. It will be appreciated that the couplings do not have to be mounted end-to-end as shown but that a single coupling could be mounted on a valve, T-fitting or other fluid distribution system member. In that event, of course, there would only be a stiffener extending from one side of the ridge 104.

With this type of rapid connect coupling no preparation of the tubing is necessary except that the end of the tubing must be cut squarely for recessing into the back plate. The internal components, particularly lock rings 50 and 51 will be made of high strength plastic such as Delrin.

What is claimed is:

1. A threadless slip fit type coupling for connecting an end portion of a smooth wall tubing to fittings or other tubing, comprising:
    (a) a generally cylindrical housing member having an outer insert end for tubing and an inner mounting end, said housing member having a tubing receiving bore through a portion of its outer end and a larger diameter bore extending through the remainder of said housing and opening from said tubing receiving bore to said inner end to define a circular cavity with a generally radially extending rear offset wall,
    (b) annular seal means disposed in said cavity adjacent said offset wall,
    (c) seal spacer means located adjacent said seal means,
    (d) at least one annular lock ring means located adjacent said spacer means, said lock ring means having a first radially inwardly extending and concave outer side surface facing said spacer means and a second radially inwardly extending and crowned inner side surface on its opposite side, and further having an internal surface angling from a larger diameter on said first surface to a smaller diameter on said second surface to define a pipe gripping edge, said lock ring also having a peripheral surface in which the external diameter of said first surface is greater than the external diameter of said second surface so that said peripheral surface is disposed at an angle to the wall of said larger bore,
    (e) an annular removable retainer member received in said cavity at the inner end of said housing for holding said seal means and lock ring means in place, and
    (f) cylindrical stiffener means within said housing to be received in said tubing when tubing is inserted in said coupling housing.

2. The coupling according to claim 1 and in which said seal means is at least one O-ring.

3. The coupling according to claim 1 and in which said seal spacer means has generally parallel sides which are substantially at right angles to the longitudinal axis of said housing.

4. The coupling according to claim 3 and in which there are two of said lock ring means.

5. The coupling according to claim 4 and in which said lock ring means are separated by a beveled spacer means.

6. The coupling according to claim 5 and in which said beveled spacer has one face facing the inner end of said housing and which is generally at right angles to the longitudinal axis of said housing and another face on the opposite side thereof which angles radially inwardly and toward said one face to define an annular concave face which is of a greater angle than the crown angle of the abutting lock ring means.

7. The coupling according to claim 6 and in which said retainer member has a circular recess on its interior side which is of substantially the same diameter as said tubing receiving bore for receiving the end of said tubing when it is inserted in said coupling housing.

8. The coupling according to claim 7 and in which said retainer member is adjacent one of said lock ring means and has a radially inwardly angling surface around said circular recess to accept the crown side of said adjacent lock ring means.

9. The coupling according to claim 1 and in which the internal angling surface of said lock ring means has a predetermined number of generally equispaced apart void sections to define a series of teeth on said pipe gripping edge.

10. The coupling according to claim 1 and in which said stiffener means has a slightly larger diameter over that portion thereof which is inside the tubing area contacted by said lock ring means.

11. The coupling according to claim 1 and in which a peripheral ridge means is provided on said stiffener to prevent the same from moving longitudinally.

12. The coupling according to claim 11 and in which there are two of said annular seal means in said cavity.

13. The coupling according to claim 12 and in which there are two of said lock ring means separated by a beveled spacer means.

* * * * *